United States Patent
Kuttenberger et al.

(10) Patent No.: US 7,822,521 B2
(45) Date of Patent: Oct. 26, 2010

(54) METHOD AND DEVICE FOR EVALUATING DRIVING SITUATIONS

(75) Inventors: Alfred Kuttenberger, Henenberg (DE); Carsten Joachim, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 721 days.

(21) Appl. No.: 11/661,542

(22) PCT Filed: Jun. 27, 2005

(86) PCT No.: PCT/EP2005/052983
§ 371 (c)(1),
(2), (4) Date: Sep. 4, 2007

(87) PCT Pub. No.: WO2006/024557
PCT Pub. Date: Mar. 9, 2006

(65) Prior Publication Data
US 2008/0167775 A1    Jul. 10, 2008

(30) Foreign Application Priority Data
Aug. 27, 2004    (DE) .................. 10 2004 041 521

(51) Int. Cl.
*B60R 21/00*    (2006.01)
*B60R 21/01*    (2006.01)
(52) U.S. Cl. ........................................ 701/45
(58) Field of Classification Search .............. 701/36
See application file for complete search history.

(56) References Cited

U.S. PATENT DOCUMENTS

| | | | | |
|---|---|---|---|---|
| 6,549,836 | B1 * | 4/2003 | Yeh et al. | 701/45 |
| 6,819,991 | B2 * | 11/2004 | Rao et al. | 701/45 |
| 7,155,342 | B2 * | 12/2006 | Kobayashi et al. | 701/301 |
| 7,200,481 | B2 * | 4/2007 | Yamamura et al. | 701/96 |
| 2002/0169534 | A1 | 11/2002 | Yamashita | |
| 2003/0051530 | A1 * | 3/2003 | Eisele et al. | 73/12.09 |
| 2003/0097212 | A1 * | 5/2003 | Feser et al. | 701/45 |
| 2004/0172185 | A1 * | 9/2004 | Yamamura et al. | 701/96 |
| 2005/0090984 | A1 * | 4/2005 | Kobayashi et al. | 701/301 |
| 2005/0169534 | A1 * | 8/2005 | Takahashi | 382/203 |

FOREIGN PATENT DOCUMENTS

| | | |
|---|---|---|
| EP | 1 316 481 | 6/2003 |
| JP | 7-65295 | 3/1995 |
| JP | 2003-323700 | 11/2003 |

* cited by examiner

*Primary Examiner*—Thomas G Black
*Assistant Examiner*—Shelley Chen
(74) *Attorney, Agent, or Firm*—Kenyon & Kenyon LLP

(57) ABSTRACT

A method and a device for evaluating driving situations, where driving-state data are ascertained and evaluated. The driving-state data are evaluated and numerically represented with regard to their risk potential for vehicle occupants, an overall risk potential (total risk) being determined by ascertaining and/or estimating currently acting forces and/or forces to be expected and a movement of the occupant resulting from them.

8 Claims, 2 Drawing Sheets

METHOD AND DEVICE FOR EVALUATING DRIVING SITUATIONS

BACKGROUND INFORMATION

The EU target of reducing traffic deaths by 50% by 2012 requires new developments in the area of vehicle and traffic safety. Such systems include, for example, reversible means for protecting passengers, such as a reversible seat-belt tensioner, which is driven by an electric motor and may already be activated prior to the actual accident, as well. In conventional systems for controlling reversible means of protection, driving-state data are ascertained and evaluated. Based on the evaluation, the driving state is classified as one of the three states of emergency braking, understeer, and oversteer. The activation of the reversible occupant-protection system is based on the pure detection of one or more of these states.

SUMMARY

A method according to an example embodiment of the present invention for evaluating driving situations should reduce the severity of injuries and the risk potential for the passengers in the case of an accident, as well as in the case of sharp movement and/or displacement of the occupants, e.g., the head striking the windshield. In this context, the driving-state data are evaluated and numerically represented with regard to their risk potential for vehicle occupants, in order to analyze the driving situation; an overall risk potential being determined by ascertaining and/or estimating currently acting forces, and/or being determined from force actions to be expected and a movement or displacement of the occupant resulting from this. The overall risk potential may then be used, for example, as a decision basis for timely activating reversible occupant-protection devices, such as a reversible seat-belt tensioner. This can fix the occupant in position in the seat and reduce the seat-belt slack. In a situation critical for the occupant, the risk of injury may be reduced by timely activating the reversible occupant-protection devices.

To ascertain and evaluate driving-state data, the device of the present invention for implementing the method may advantageously access sensor systems and/or control units, which are already present in the vehicle and may be part of an electronic stability program (ESP) and/or an anti-lock braking system (ABS) and/or an airbag control system.

In one particularly advantageous embodiment, the overall risk potential is calculated as an abstract numerical value, preferably in the value range of 0 to 1, and modularly made up of several partial risk potentials. A first partial risk potential represents, for example, the risk to the occupant as a result of the current forces, and a second partial risk potential represents the anticipated risk from the forces to be expected. In contrast to conventional methods, which undertake a classification of the driving state as a basis for a triggering decision, the method of the present invention ascertains the general risk potential for the occupant and its numerical representation.

The overall risk potential may be output to a control (triggering) unit for occupant-protection devices in the form of, for example, a binary input signal or also a continuous input signal. The continuously output risk value may also be used for other safety systems as additional information.

The first partial risk potential may be determined, for example, from the risk variables of transverse loading and/or longitudinal loading and/or speed.

The transverse loading may be calculated, for example, from the driving-state data of transverse acceleration and/or steering angle and/or change in transverse acceleration and/or change in steering angle, and the longitudinal loading may be calculated, for example, from the driving-state data of longitudinal acceleration and/or steering angle and/or change in longitudinal acceleration and/or change in steering angle.

The second partial risk may be determined, for example, from the risk variables of steering risk and/or steering tendency and/or speed, a driver's command and a vehicle state being considered in the determination of the second partial risk.

A steering stability as a part of the risk variable of steering risk may be calculated, for example, from the driving-state data of speed and/or transverse acceleration and/or longitudinal acceleration and/or steering angle and/or yaw rate. A drift tendency as a part of the risk variable of steering risk may be calculated from the driving-state data of speed and/or transverse acceleration and/or longitudinal acceleration and/or steering angle and/or yaw rate and their derivatives with respect to time.

A steering-change behavior as a part of the risk variable of steering tendency may be calculated, for example from the driving-state data of yaw acceleration and/or yaw rate and/or change in steering angle and/or transverse acceleration and/or change in transverse acceleration and/or speed. A steering plausibility as a part of the risk variable of steering tendency may be calculated from the driving-state data of yaw rate and/or transverse acceleration and/or steering angle.

BRIEF DESCRIPTION OF THE DRAWINGS

An exemplary embodiment of the present invention is depicted in the drawing and is explained in detail in the following description.

DETAILED DESCRIPTION OF EXAMPLE EMBODIMENTS

Figure 1:
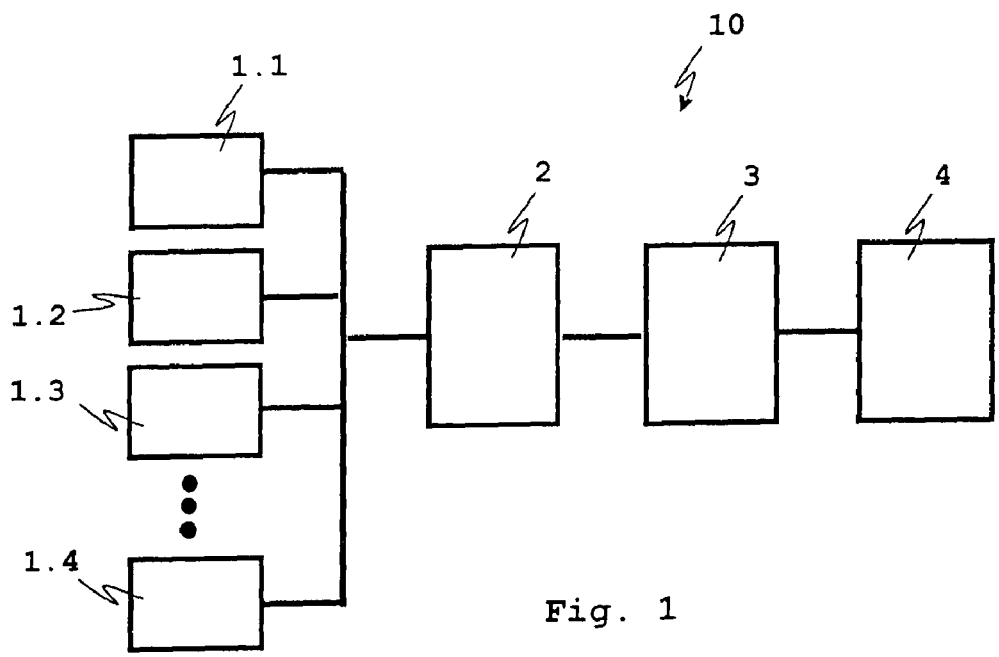
FIG. 1 shows a block diagram of an occupant protection system having a device according to an example embodiment of the present invention for evaluating the driving situations.

As is apparent from FIG. 1, an occupant protection system 10 includes an ESP control unit 1.1, an ABS control unit 1.2, and an airbag control unit 1.3, which ascertain, evaluate, and pass on driving-state data, an evaluating and control unit 2, which receives the ascertained driving-state data and evaluates it with regard to its risk potential for vehicle occupants and outputs the determined, overall risk potential to a triggering unit 3 for activating a reversible occupant-protection component 4, e.g., a seat-belt tensioner.

Evaluating and control unit 2 determines overall risk potential "total risk" by ascertaining and/or estimating current forces and/or forces to be expected and a movement of the occupant resulting from them.

Figure 2:
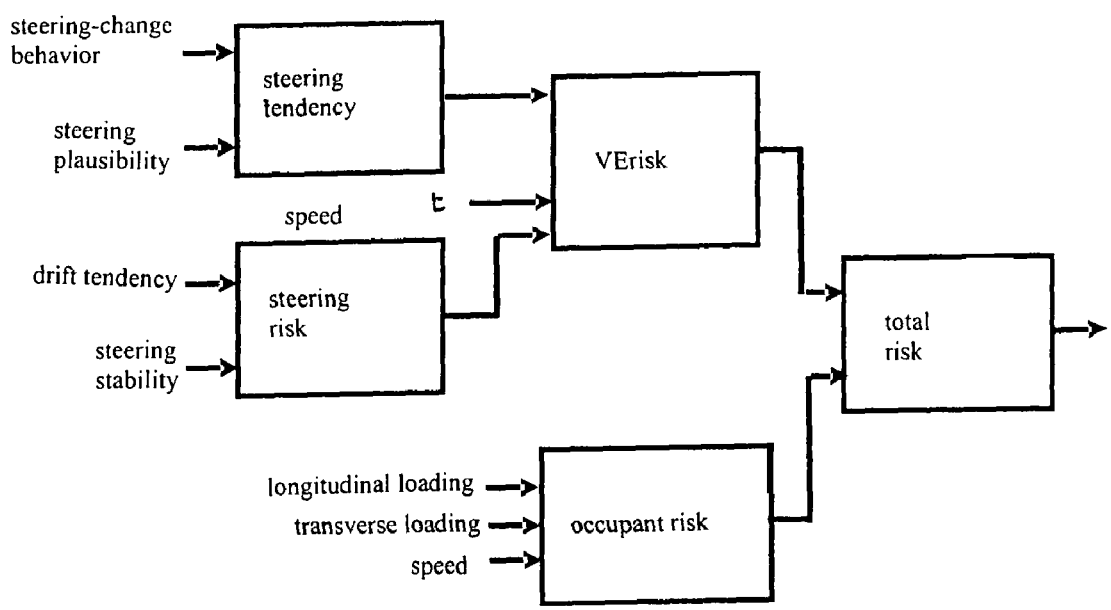
FIG. 2 shows a block diagram of the method according to an example embodiment of the present invention for evaluating driving situations.

As is apparent from FIG. 2, the method according to an example embodiment of the present invention for evaluating driving situations determines an overall risk potential, "total risk" as an abstract numerical value, e.g., in the range of values of [0 . . . 1], which represents the risk to the occupant. This value "total risk" is modularly made up of partial risk potentials "occupant risk" and "VErisk," which are in turn made up of subvariables. The two main strands, "occupant risk" and "VErisk" respectively represent the partial risk potentials for the occupant as a result of the current forces (shown in detail in FIG. 4) and the anticipated risk potential due to possible future forces that are expected on the basis of the driving state (shown in detail in FIG. 3).

Overall risk potential "total risk" is the information that leads to the triggering of the reversible occupant-protection component, in this case, seat-belt tensioner 4. A corresponding triggering algorithm takes into account ascertained value "total risk" and its time characteristic and makes, on this basis, a binary decision "on" or "off", using, for example, appropriate threshold values. In this connection, e.g., an upper threshold value, above which the seat-belt tensioner is triggered (on), is checked. An example of a condition for reset is that the value "total risk" is below a lower threshold value (off) for, e.g., a time span to be set. Other specific embodiments are also possible, e.g., using an integral, or multi-stage decisions for different seat-belt forces may be implemented. In the related art, a classification of the driving state forms the basis for the triggering decision. One object of the present invention is to ascertain a general risk for the occupant and its abstract numerical representation. This overall risk potential "total risk" is made up of partial risk potential "occupant risk" based on currently acting forces, as well as of partial risk potential "VErisk" based on forces to be expected due to the current driving state. In order to ascertain partial risk potential "VErisk," driver's command "setpoint" and current vehicle state "actual" and a float-angle approximation are taken into account and subjected to an evaluation. The value "total risk" is recalculated in each time step and is therefore a continuous variable and not, for instance, a discontinuous variable.

Figure 4:
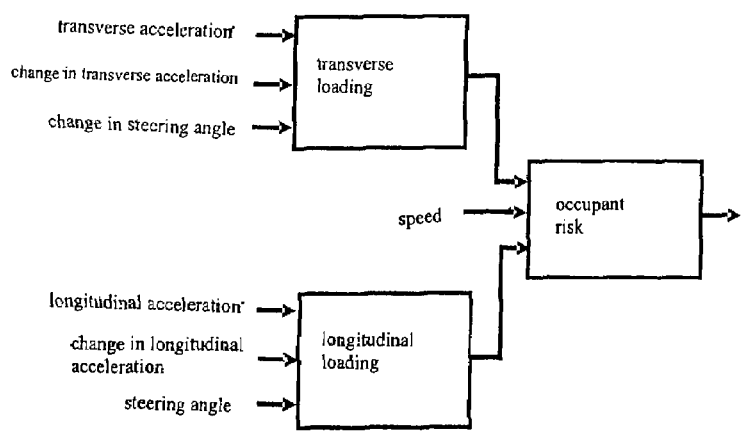
FIG. 4 shows a block diagram of a partial method for determining a second partial risk potential of the method from FIG. 2.

As is apparent from FIG. 4, partial risk potential "occupant risk," i.e., the current occupant risk, is calculated from two risk variables on the basis of acting forces and/or displacements and/or movements and/or accelerations. A risk variable "transverse loading" represents the transverse action and evaluates this partial risk on the basis of transverse acceleration and/or steering angle and/or changes in transverse acceleration. The other risk variable "longitudinal loading" represents the longitudinal action and evaluates this on the basis of longitudinal acceleration and/or changes in longitudinal acceleration and/or changes in steering angle.

Figure 3:
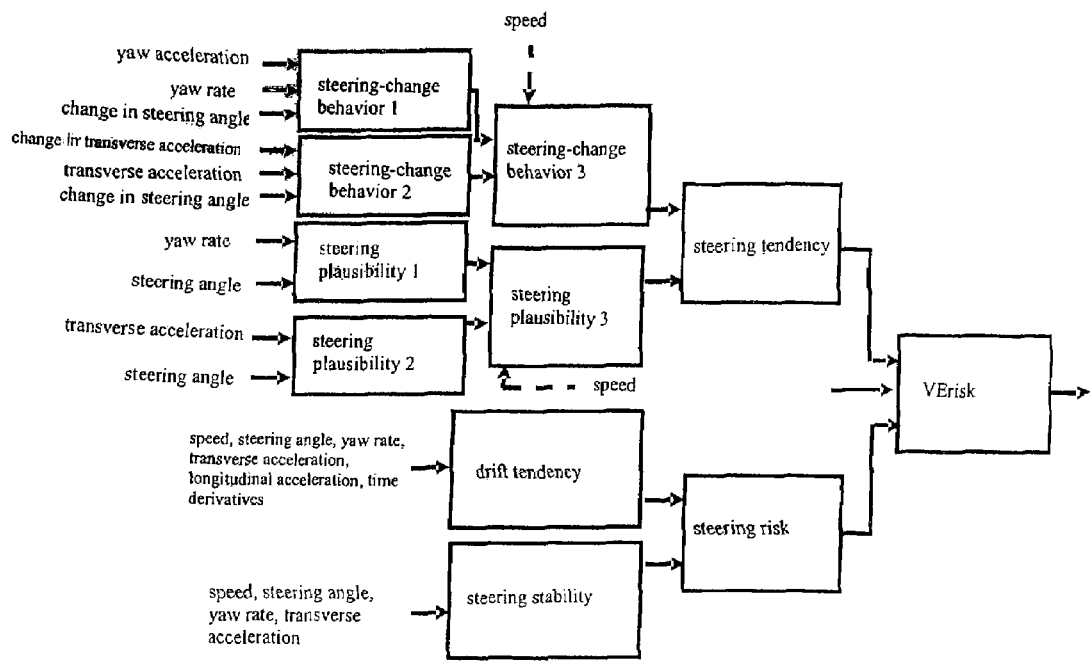
FIG. 3 shows a block diagram of a partial method for determining a first partial risk potential of the method from FIG. 2.

As is apparent from FIG. 3, partial risk potential "VErisk," i.e., the risk to the occupant based on the force to be expected, is calculated from risk variables "steering risk" and "steering tendency," which carry out an evaluation of the driving state with regard to its stability "steering risk" and its plausibility "steering tendency." To this end, in order to calculate risk variable "steering stability," which is part of vehicle variable "steering risk," the vehicle reaction is compared to the driver's command, in view of driving-state variables steering angle and/or transverse acceleration and/or vehicle speed and/or wheelbase and/or yaw rate. The risk variable "drift tendency," which is likewise part of risk variable "steering risk," considers, in addition to the above-mentioned variables, the derivatives of these variables with respect to time and a float-angle approximation based on them.

Risk variable "steering tendency" is based on plausibility considerations regarding the stability of the driving state. To determine the risk variable "steering tendency," different steering-change behaviors "steering-change behavior 1," "steering-change behavior 2," and "steering-change behavior 3" are calculated by combining the driving-state data of yaw acceleration and/or yaw rate and/or changes in steering angle and/or transverse acceleration and/or changes in transverse acceleration. To determine risk variable "steering tendency," the steering plausibilities "steering plausibility 1," "steering plausibility 2," and "steering plausibility 3" are calculated by combining the driving-state data of yaw rate and/or transverse acceleration and/or steering angle. Optionally, the speed may be considered as a further variable in the calculation of the steering-change behaviors or the steering plausibilities. This is represented in FIG. 3 by dashed arrows.

The described exemplary combinations of driving-state variables for ascertaining the different risk variables and/or partial risk potentials "occupant risk" and "VErisk" may be supplemented with further combinations of the indicated driving-state data or risk variables. Thus, for example, risk variable "speed" may be considered in the determination of overall risk potential "total risk" instead of in the calculation of partial risk potentials "occupant risk" and "VErisk." In addition, further, unspecified driving-state data and risk variables, which are capable of determining the partial risk potential, may be considered. Furthermore, the different risk variables and/or partial risk potentials may be subjected to weighting.

According to the example embodiment of the present invention, it does not undertake any classification of the driving states in understeering and oversteering, but generally a deviation between driver's command and vehicle behavior is evaluated as a possible risk to the occupant. In order to mathematically determine the risk variables, the partial risk potentials, and the overall risk potential, a methodology may be used that functions with the aid of flexible threshold values, e.g., a specific embodiment of a fuzzy logic.

What is claimed is:

1. A method for evaluating driving situations, comprising:
ascertaining and evaluating driving-state data, the driving-state data being evaluated and numerically represented with regard to risk potential for vehicle occupants, an overall risk potential being determined by at least one of ascertaining and estimating the current acting forces and the forces to be expected;
wherein the overall risk potential is modularly made up of a first partial risk potential and a second partial risk potential, the overall risk potential being calculated as an abstract numerical value in a range of 0 to 1;
wherein the first partial risk potential is the risk to an occupant as a result of the current forces and the first partial risk potential is determined from at least one of a first risk variable representing a transverse loading, a second risk variable representing a longitudinal loading, and a third risk variable representing a speed; and
wherein the second partial risk potential is an anticipated risk due to the forces to be expected, and the second partial risk potential is determined from at least one of a fourth risk variable representing a steering risk and a fifth risk variable representing a steering tendency.

2. The method as recited in claim 1, wherein the first risk variable is calculated from driving-state data of at least one of transverse acceleration, steering angle, change in transverse acceleration, change in steering angle, and the second risk variable is calculated from the driving-state data of at least one of longitudinal acceleration, steering angle, change in longitudinal acceleration, and change in steering angle.

3. The method as recited in claim 1, wherein a driver's command and a vehicle state are taken into account in the determination of the second partial risk potential.

4. The method as recited in claim 1, wherein a steering stability is part of the fourth risk variable, the steering stability being calculated from driving-state data of at least one of speed, transverse acceleration, longitudinal acceleration, steering angle, and yaw rate; and wherein at least one of a drift tendency and a float-angle approximation forms part of the fourth risk variable, the at least one of the drift tendency and float angle approximation being calculated from driving-state data of at least one of speed, transverse acceleration, longitudinal acceleration, steering angle, and yaw rate, and their derivatives with respect to time.

5. The method as recited in claim 1, wherein a steering-change behavior is part of the fifth risk variable, the steering change behavior being calculated from driving-state data of at least one of yaw acceleration, yaw rate, change in steering angle, transverse acceleration, and change in transverse acceleration; and wherein a steering plausibility is part of the fifth risk variable, the steering plausibility being calculated from driving-state data of at least one of yaw rate, transverse acceleration, and steering angle.

6. The method as recited in claim 1, wherein at least one of the determined overall risk potential and a the calculated time characteristic of the determined overall risk potential are input as an input variable into a triggering unit for an occupant-safety device.

7. The method as recited in claim 1, wherein the occupant-safety device is a seat-belt tensioner.

8. A device for evaluating driving situations, comprising:

an evaluating and control unit adapted to receive driving-state data from at least one of an ESP control unit, an ABS control unit, and an airbag control unit, the evaluating and control unit further adapted to evaluate the driving state data with regard to a risk potential for vehicle occupants and to output it in the form of a numerical representation to a triggering unit for an occupant-protection system, the evaluating and control unit further adapted to determine an overall risk potential by at least one of ascertaining and calculating the current forces and the forces to be expected;

wherein the overall risk potential is modularly made up of a first partial risk potential and a second partial risk potential, the overall risk potential being calculated as an abstract numerical value in a range of 0 to 1;

wherein the first partial risk potential is the risk to an occupant as a result of the current forces and the first partial risk potential is determined from at least one of a first risk variable representing a transverse loading, a second risk variable representing a longitudinal loading, and a third risk variable representing a speed; and wherein the second partial risk potential is an anticipated risk due to the forces to be expected, and the second partial risk potential is determined from at least one of a fourth risk variable representing a steering risk and a fifth risk variable representing a steering tendency.

\* \* \* \* \*